F. F. FOWLER.
Combined Stack Bottom and Feed Rack.

No. 57,115. Patented Aug. 14, 1866.

Witnesses:
N. W. Hailborn
C. C. Wilson

Inventor:
F. F. Fowler
By atty A. B. Stoughton

UNITED STATES PATENT OFFICE.

F. F. FOWLER, OF UPPER SANDUSKY, OHIO.

IMPROVED STACK-BOTTOM AND FEED-RACK COMBINED.

Specification forming part of Letters Patent No. 57,115, dated August 14, 1866.

*To all whom it may concern:*

Be it known that I, FINDLEY F. FOWLER, of Upper Sandusky, in the county of Wyandot and State of Ohio, have invented a certain new and useful Improvement in a Portable Stack-Bottom, Feed-Rack, and Shelter; and I do hereby declare the following to be a full, clear, and exact description of the same, reference being had to the accompanying drawings, making a part of this specification, in which—

Figure 1:
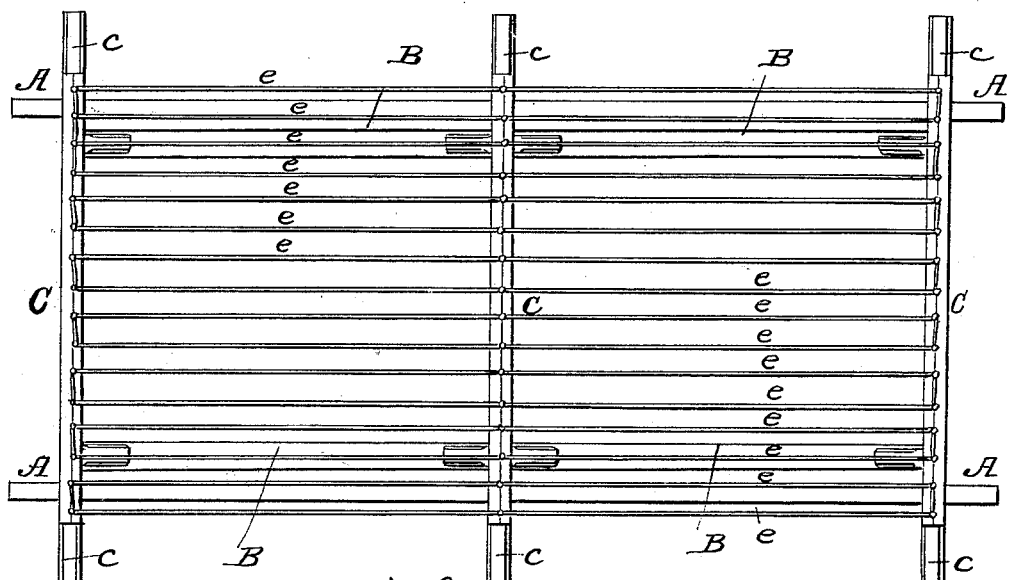
Figure 2:
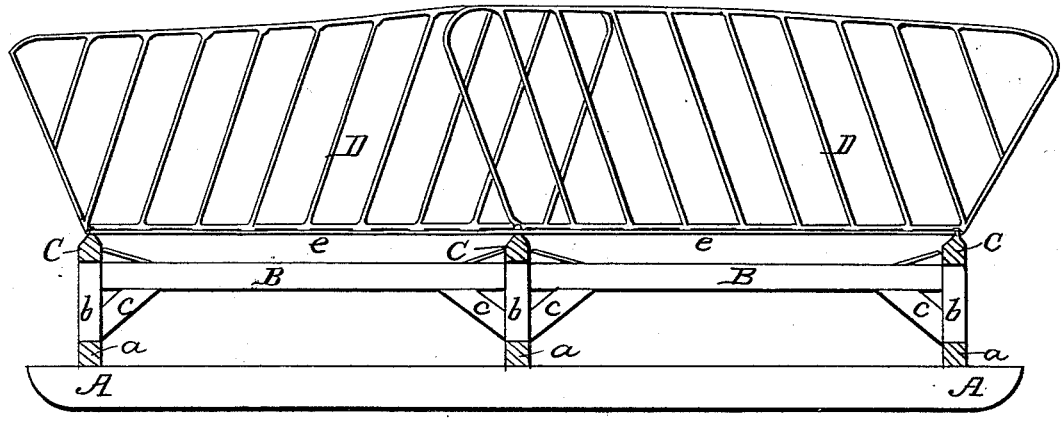

Figure 1 represents a top plan, and Fig. 2 represents a side view, of one of the stack-bottoms, &c.

The object and purpose of my invention is to make a cheap, durable, and convenient frame or bottom on which to build stacks of hay or of straw for three different objects in addition to its portable character, which admits of its being drawn to any part of the field or cattle-yard where it is desirable to build the stack.

First. It keeps the hay or straw from the ground and prevents that portion of the stack from getting damp and musty.

Second. It serves as a rack, for the cattle to feed upon the straw or hay so built upon the bottom.

Third. It forms a shelter underneath it for sheep or small animals of any kind, as well as under its flaring sides or ends.

To enable others skilled in the art to make and use my invention, I will proceed to describe the same with reference to the drawings.

The bottom timbers, A, are made runner-fashion, so that a horse, team, or yoke of cattle may drag the contrivance anywhere where a stack is to be built. Upon cross-timbers *a a*, uniting these bottom pieces, are upright short posts *b b*, connected at their tops by longitudinal pieces B, and suitably braced, as at *c*, so as to make a substantial and cheap understructure. Upon the tops of the posts *b* are placed cross-pieces C C C, that are chamfered off at their tops, as seen in Fig. 2. Upon these pieces C are laid or secured rods, wires, or thin slats *e*, edgewise, so as to leave a few inches space between them. Upon this bottom of rods, wires, or slats the stack is built, and the cattle from underneath the stack can feed from it through between the rods, wires, or slats, and be at the same time sheltered by it.

If it be desirable, wings D, made rack-fashion and set inclined outward, may be put upon the top of the frame, and braced by a prop or brace, so as to very much widen out the stack and make more feeding-room and shelter for larger cattle; or these side racks may only partially surround the stack or be at the ends alone, or at the sides alone, whichever may be preferred.

The stack-bottom may be just high enough to admit sheep or small cattle underneath, where they can feed and shelter, or it may be high enough for large cattle. As the cattle or stock eat away from the bottom of the stack, it (the stack) settles down by its weight, so that the fodder is always within the reach of the animal so long as the stack lasts.

The portable character of the contrivance is important, as the cattle and stock can thus be fed at different portions of the field in different seasons, and thus distribute their droppings over a greater extent of soil or scatter it more over the field.

What I claim as my invention, and desire to secure by Letters Patent, is—

A portable stack-bottom, feed-rack, and stock-shelter, constructed, arranged, and operating as herein described, and for the purpose set forth.

F. F. FOWLER.

Witnesses:
  A. B. STOUGHTON,
  EDM. F. BROWN.